United States Patent Office 3,200,287
Patented Aug. 10, 1965

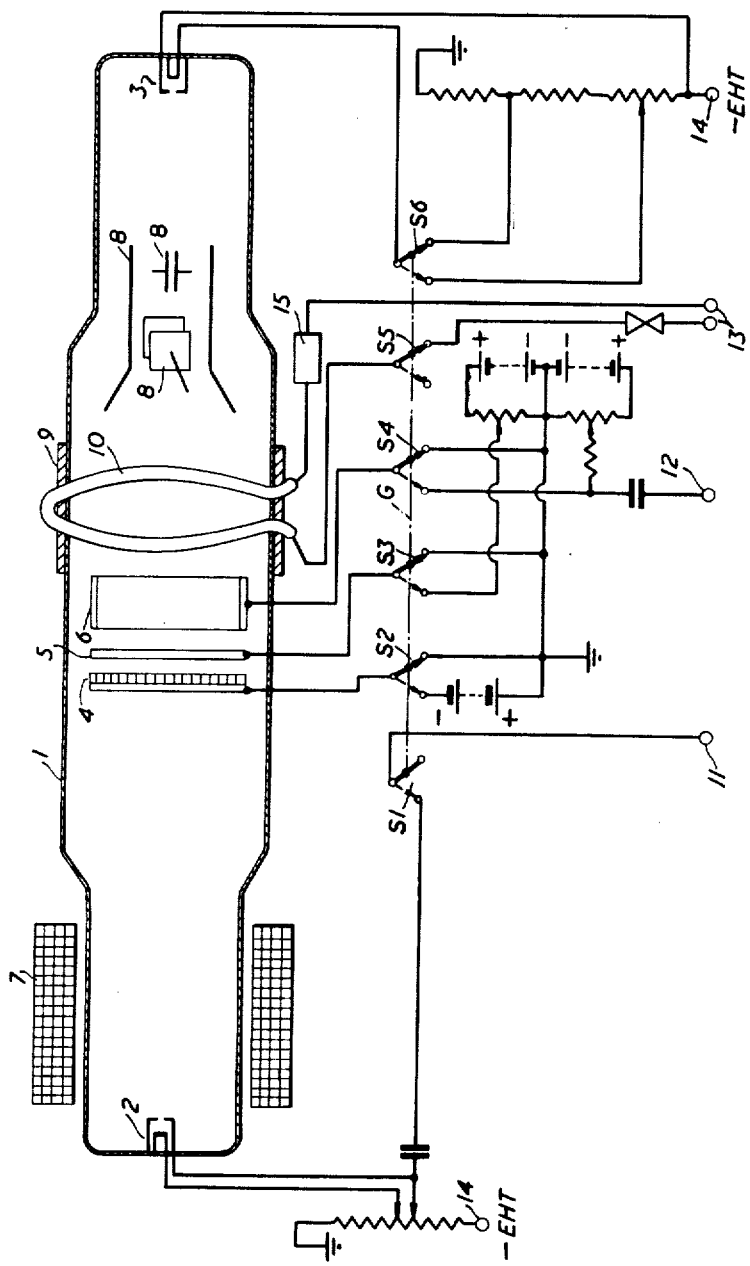

3,200,287
SIGNAL STORING CATHODE RAY TUBE ARRANGEMENTS
Donald Leopold Plaistowe, Chelmsford, Essex, England, assignor to The Marconi Company Limited, a British company
Filed Feb. 20, 1963, Ser. No. 259,814
Claims priority, application Great Britain, Mar. 12, 1962, 9,331/62
5 Claims. (Cl. 315—12)

This invention relates to signal storing cathode ray tube arrangements, that is to say, to arrangements including cathode ray tubes of the kind in which signals for subsequent utilisation are stored in the form of electrical charges on a storage target. One well known form of cathode ray tube of this kind is the so-called "storage Vidicon" television camera tube wherein electrical charges representative of light and shade at different points of a subject of television transmission are stored on a storage target in the tube. Another is the so-called "scan conversion" cathode ray tube wherein signals—for example, video signals from the receiver of a radar equipment—are stored on a storage target by means of a signal modulated so-called "writing" electron beam which scans the target in, for example, a polar coordinate raster of the P.P.I. (plan position indicator) type, a so-called "reading" electron beam which scans the target in, for example, a television type raster of lines, being employed to develop video signals for utilisation from the stored signals "written" on the target. There are numerous other known examples of cathode ray tubes of the kind referred to.

It is often an operating desideratum of equipment including a signal storage cathode ray tube to be able to expunge signals stored in the tube quickly and at will. Thus, for example, in the case of a radar equipment employing a scan conversion cathode ray tube it is often desirable to be able to wipe out quickly a pattern of stored charges representative of a radar "picture" in order to store one representative of a different radar picture or, if a radar picture has been partly obscured by interfering signals, to build up a new picture as quickly as possible after the interference has ceased. The at present usual way of expunging a stored pattern of charges on the target of a tube of the kind referred to is to subject it to uniform high intensity electron beam bombardment. Thus, in the case of a scan conversion tube employed in a radar equipment, the normal method of expunging a stored picture is to turn on the beam normally used for reading to full strength and scan the target with it. In practice, with a normal scan conversion tube in which scanning of the target by the reading beam gives rise to substantial secondary emission therefrom, the target has to be scanned by the full strength reading beam for a period of 30 seconds or thereabouts before the stored pattern of charges is expunged sufficiently for satisfactory storing of a new pattern to be commenced. This is obviously a serious defect and in a radar equipment may be the cause of a serious loss of information. The present invention seeks to provide improved and quick acting means for expunging signals stored on the storage target of a signal storing cathode ray tube.

According to this invention a signal storing cathode ray tube arrangement comprises in combination a signal storing cathode ray tube having a target adapted to store signals in the form of electrical charges, a light source operable at will and arranged when operated to irradiate said target with light to expunge charges stored by said target, and means effectively shielding said target from light and radiant heat from sources other than said light source. When the target is irradiated the resistance between the charged elements thereof and the normally provided back plate thereof is greatly reduced and accordingly the charges are quickly expunged.

Preferably the light source operable at will is an ultraviolet light source. In this case the shielding means is preferably constituted by a shield of so-called black glass.

In a preferred arrangeemnt the light source is a tubular electric discharge lamp with a quartz or like tubular envelope having a rare gas filling (e.g., xenon) and bent into an almost complete ring of approximately the same diameter as that of the tube envelope, said lamp being so positioned as to irradiate the tube target (when switched on), a cylindrical black glass shield being interposed between the lamp and the target. This type of lamp will switch on or off almost instantaneously. A mercury vapour lamp with a black glass envelope could be used in some cases but, for most cases, it is not suitable because of the time it takes to switch on and because of the heat it develops. In general, a "cold" lamp which will switch on nearly instantaneously and which will produce ultra-violet light should be used.

A preferred embodiment of the invention comprises a signal storing scan conversion tube including, in an evacuated envelope, a storage target, a ring electrode adjacent said target on one side thereof, a collector electrode adjacent said ring electrode and on the side thereof remote from said target, a reading gun, means for causing the beam from said reading gun to scan said target through the collector and ring electrons, and a writing gun adapted to scan said target on the side thereof opposite that scanned by the reading gun; a cold electric discharge lamp adapted to be switched on nearly instantaneously and having a tubular envelope bent into an almost complete ring and encircling the tube envelope in the neighbourhood of the target and positioned to irradiate said target (when switched on) with ultra violet light; a black glass shield outside the tube envelope and between the lamp and the target; and gang actuated switch means adapted when actuated to switch on the lamp, put the writing and reading guns out of action, and earth the collector and ring electrodes and the normally provided back plate of the target. Preferably, in order to facilitate uniform irradiation of the target by the lamp, the collector electrode consists of a cylinder of quartz, having an interior deposit of transparent conductor—e.g., stannous oxide—to which the normally provided external connector is connected.

The invention is illustrated in the accompanying drawing which shows diagrammatically one embodiment.

Referring to the drawing, 1 is the envelope of a scan conversion tube having a writing gun 2 at one end and a reading gun 3 at the other. 4 is a target of normal construction including the usual back plate. Near the target is a ring electrode 5—the so-called "anti-blotch" ring—and next to this ring is a collector electrode 6 in the form of a transparent quartz cylinder with an internal deposit of transparent conductive stannous oxide. 7 represents a coil system for causing the beam from gun 2 to scan the target in a polar co-ordinate raster like that of a P.P.I. display tube and 8 represents an electro-static deflection system for causing the beam from gun 3 to scan the target in a television type line raster. S1, S2, S3, S4, S5 and S6 are a set of ganged switches, the ganging of which is represented by the chain line G. 9 is a cylindrical shield of black glass and 10 is a xenon filled cold electric discharge lamp almost completely encircling the envelope 1 outside the shield 9. The arrangement is only schematically represented, but it is such that, when the lamp is switched on, ultra-violet light therefrom substantially uniformly irradiates the target which is effectively protected from all other light and heat rays. Signals from a signal source—e.g., the video output from a radar receiver (not shown)—are applied at terminal 11;

read-off stored signals are taken off for utilisation from terminal 12; a suitable mains supply is connected at terminals 13; and suitable E.H.T. for normal operation is applied at terminals 14. Block 15 represents a high tension voltage supply source for the lamp.

When the ganged switches are in the position shown in broken lines the tube operates in the normal well known manner of a scan conversion tube, signals being written on the target and read off for utilisation. By throwing the switches to the other positions, shown in full lines, the unit 15 is energised via switch S5 to light the lamp 10, the ultra-violet light from which reaches the target and expunges any signals stored there. In order to prevent too great changes occurring in the operational characteristics of the tube while the light is switched on, the writing gun is switched off by switch S1 to prevent charges being applied to the target; the back plate of the target is earthed through switch S2; the electrodes 5 and 6 are earthed through switches S3 and S4; and the reading beam is switched off owing to the changed potential applied to the reading gun cathode through switch S6. After clearing the target the ganged switches may be returned to the broken line positions to secure normal operation of the tube.

The invention is obviously not limited to the particular arrangement or application illustrated. For example, it may be used to expunge signals stored on the storage target of a storage Vidicon camera tube used, for example, to view the screen of the cathode ray display tube of a radar equipment. In such a case, an arcuate gas filled cold electric discharge lamp with its envelope being bent into an almost complete circle could again be used to irradiate the target with ultra-violet light, the lamp being suitably mounted near the viewing end of the camera tube, the storage target of which is shielded from other light or heat rays.

I claim:

1. A signal storing cathode ray tube arrangement comprising in combination a signal storing cathode ray tube having a target adapted to store signals in the form of electrical charges, an ultra-violet light source operable at will and arranged when operated to irradiate said target with light to expunge charges stored by said target, and means effectively shielding said target from light and radiant heat from sources other than said light source.

2. An arrangement as claimed in claim 1 wherein the shielding means comprises black glass.

3. An arrangement as claimed in claim 1 wherein the light source is a tubular electric discharge lamp with a quartz tubular envelope having a rare gas filling and bent into an almost complete ring of approximately the same diameter as that of the tube envelope, said lamp being so positioned as to irradiate the tube target when the lamp is energized, and wherein said shielding means comprises a cylindrical black glass shield interposed between the lamp and the target.

4. A signal storing cathode ray tube arrangement comprising a signal storing scan conversion tube including, in an evacuated envelope, a storage target having a back plate, a ring electrode adjacent said target on one side thereof, a collector electrode adjacent said ring electrode and on the side thereof remote from said target, a reading gun, means for causing the beam from said reading gun to scan said target through the collector and ring electrodes, and a writing gun adapted to scan said target on the side thereof opposite that scanned by the reading gun; a cold electric discharge lamp adapted to be switched on nearly instantaneously and having a tubular envelope bent into an almost complete ring and encircling the tube envelope in the neighbourhood of the target and positioned to irradiate said target with ultra violet light when the lamp is switched on; a black glass shield outside the tube envelope and between the lamp and the target; and gang actuated switch means adapted when actuated to switch on the lamp, put the writing and reading guns out of action, and earth the collector and ring electrodes and the back plate of the target.

5. An arrangement as claimed in claim 4 wherein the collector electrode comprises a cylinder of quartz having an interior deposit of transparent conductor and an external connector connected to said transparent conductor.

References Cited by the Examiner

UNITED STATES PATENTS

| | | | |
|---|---|---|---|
| 2,787,724 | 4/57 | Webley | 315—12 |
| 2,839,699 | 6/58 | Szegho et al. | 315—10 X |

DAVID G. REDINBAUGH, *Primary Examiner.*